United States Patent [19]
Kondo et al.

[11] Patent Number: 5,481,678
[45] Date of Patent: Jan. 2, 1996

[54] DATA PROCESSOR INCLUDING SELECTION MECHANISM FOR COUPLING INTERNAL AND EXTERNAL REQUEST SIGNALS TO INTERRUPT AND DMA CONTROLLERS

[75] Inventors: Hiroyuki Kondo; Yuichi Nakao; Kazumi Koyama, all of Itami, Japan

[73] Assignee: Mitsubishi Denki Kabushiki Kaisha, Tokyo, Japan

[21] Appl. No.: 92,021

[22] Filed: Jul. 12, 1993

Related U.S. Application Data

[63] Continuation of Ser. No. 499,876, Mar. 27, 1990, abandoned.

[30] Foreign Application Priority Data

Mar. 30, 1989 [JP] Japan ................................ 1-83185
Oct. 23, 1989 [JP] Japan ................................ 1-275433

[51] Int. Cl.⁶ .................................................. G06F 13/00
[52] U.S. Cl. ........................ 395/280; 395/842; 395/848; 364/238.2; 364/238.3; 364/240; 364/242.3; 364/242.31; 364/DIG. 1
[58] Field of Search ................................ 395/275, 325

[56] References Cited

U.S. PATENT DOCUMENTS

| | | | |
|---|---|---|---|
| 4,648,029 | 3/1987 | Cooper et al. | 364/200 |
| 4,751,634 | 6/1988 | Burrus, Jr. et al. | 364/200 |
| 4,837,677 | 6/1989 | Burrus, Jr. et al. | 364/200 |
| 4,839,820 | 6/1989 | Kinoshita et al. | 364/491 |
| 4,866,597 | 9/1989 | Kinoshita | 364/200 |
| 5,063,498 | 11/1991 | Hirahara et al. | 395/425 |

FOREIGN PATENT DOCUMENTS 62-75857  4/1987  Japan ............................. G06F 13/00

OTHER PUBLICATIONS

"At Last–a –data–comm interface chip that really unloads your CPU . . ." Everit W. Cole, Electronic Design, vol. 27, No. 8 Apr. 12, 1979.
"MP Makes the connection to data communication lines" Alan J. Weissberger, Electronics Design vol. 31 (Nov. 1983).
Intel iAPX 86/88 186/188 User's Manual Hardware Reference, 1985, pp. 2–1 through 2–82.

*Primary Examiner*—Kevin A. Kriess
*Assistant Examiner*—Dennis M. Butler
*Attorney, Agent, or Firm*—Townsend and Townsend and Crew

[57] ABSTRACT

A data processor includes an interrupt control unit (102); a direct memory access control unit (103); a selection unit (104) for selecting a connection of ready and error signals from a serial communication control unit and external interrupt and DMA request signals with interrupt inputs to the interrupt and the DMA control units; and a selection setting unit (105) for setting a selection mode of the selection unit, thereby making possible to not only switch between a process by interrupt and a process by DMA transfer by programming according to the application but also make efficient use of the hardware resources in the data processor.

10 Claims, 7 Drawing Sheets

DATA PROCESSOR INCLUDING SELECTION MECHANISM FOR COUPLING INTERNAL AND EXTERNAL REQUEST SIGNALS TO INTERRUPT AND DMA CONTROLLERS

This is a continuation of application Ser. No. 07/499,876, filed Mar. 27, 1990, now abandoned.

BACKGROUND OF THE INVENTION

The present invention relates to a data processor for controlling a serial communication.

A serial communication control unit (serial communication control means) for such a data processor activates a ready signal upon completion of a cycle of data transmission or reception and requests other units for data processing, such as writing the next transmitting data or reading the received data. These data processes are divided into two methods; a process by interrupt and a process by direct memory access (DMA) transfer.

The transfer process by interrupt is carried out as follows. The serial communication control unit activates a ready signal upon completion of a cycle of data transmission or reception and transmits it to a central processing unit (CPU) via an interrupt control unit. Upon reception of the ready signal as an interrupt request from the serial communication control unit, the CPU saves the internal conditions and determines the interrupt process routine to be executed for starting the execution.

The interrupt process routine checks the conditions of the serial communication control unit and, if transmission is completed, writes data for the next data transmission to the serial communication control unit and, if reception is completed, reads the received data from the serial communication control unit. The above process which is carried out whenever the serial communication control unit transmits or receive a piece of data is repeated until all data is transferred. Thus, the unit of process carried out by the CPU is the transfer of a piece of data. Whenever the serial communication control unit transfers a piece of data, an interrupt is applied to the CPU to process the transferred data.

A conventional data processor using such interrupts, which is described in Japanese Patent Application Kokai No. 62-75857, is shown in FIG. 4. It includes a central processing unit (CPU) 11 for processing data, a system bus 12, a serial interface circuit 13 for serial communication control, a buffer 14 for transmission and reception, and an interrupt controller 15 for controlling interrupts. The process by this data processor is the same as the above process by interrupt and its description is omitted.

In addition to the process by interrupt wherein the unit of process carried out by the CPU is the transfer of a piece of data carried out by the serial communication control unit, there is another process or process by DMA transfer wherein the CPU does not process any data until a group of pieces of data is transferred. This process by DMA transfer is described below.

First of all, it is assumed that the DMA control unit (DMA control means) has a transfer unit and that the main memory has a buffer memory area for storing the transfer data. When the serial communication control unit completes a data transfer, a ready signal is activated and transmitted to the DMA control unit (DMA control means). Taking reception for example, upon reception of the ready signal as a DMA transfer request from the serial communication control unit, the DMA control unit carries out by DMA transfer reading the received data from the serial communication control unit, which has completed the transfer, and writing the data in the buffer memory area which has been held. The DMA transfer between the serial communication control unit and the buffer memory area is repeated until all data is transferred. Upon completion of the transfer completion interrupt to the CPU indicating completion of the serial communication transfer. Upon reception of the interrupt, the CPU carries out a process for processing the interrupt and starts processing the interrupt to carry out a programmed process for all the data stored in the buffer memory area.

In this way, in the process by DMA transfer, a block of data to be transmitted or received by the serial communication control unit is stored in a buffer memory area by DMA transfer, and the CPU processes it at once when all the data of the serial communications is transferred.

A conventional data processor for carrying out such a process by DMA transfer, which is described in Japanese Patent Application Kokai No. 62-75857, is shown in FIG. 5. It includes a central processing unit (CPU) 11, a system bus 12, a serial interface circuit 13 for serial communication control, an interrupt controller 15 for controlling interrupts, a receiving buffer 16, a transmitting buffer 17 (the receiving buffer 16 and the transmitting buffer 17 constituting a memory unit 18), a direct memory access controller (DMAC) 19 as DMA control means, a data comparator 20, and a local data bus 21.

The process by DMA transfer by this data processor is the same as described above, and its description is omitted.

In the data processor of FIG. 5, the ready signal from the serial communication control unit is hard wired to the DMA control unit as a DMA transfer request so that it is possible to use only the process by DMA transfer in the serial communication data processing. In the data processor with a serial communication control unit of FIG. 4, on the other hand, the ready signal from the serial communication control unit is hard wired to the interrupt control unit as an interrupt request line so that it is possible to use only the process by interrupt in the serial communication data processing.

SUMMARY OF THE INVENTION

Accordingly, it is an object of the invention to provide a data processor in which a process by either interrupt of DMA transfer may be used for serial communication data processing depending on the application.

It is another object of the invention to provide a data processor which has the improved utility of the hardware resources therein.

According to the invention there is provided a data processor having a main memory, which includes a serial communication control unit for activating not only a ready signal upon completion of a cycle of data transmission or reception to request writing the next transmission data or reading the received data but also an error signal when an error takes place; a central processing unit for processing data; an interrupt control unit for controlling interrupts to the central processing unit; a direct memory access control unit for directly accessing the main memory for storing information necessary for data processing and applies an interrupt request to the interrupt control means; a selection unit for making selection by switching a ready signal and an error signal from the serial communication control unit and a request signal from the outside to either the interrupt control means or the direct memory access control unit; and a selection setting unit responsive to an instruction from the central processing unit to set a connection mode of the selection unit.

The above and other objects, features, and advantages of the invention will become more apparent from the following description when taken in conjunction with the accompanying drawings.

DESCRIPTION OF THE PREFERRED EMBODIMENT

Figure 1:
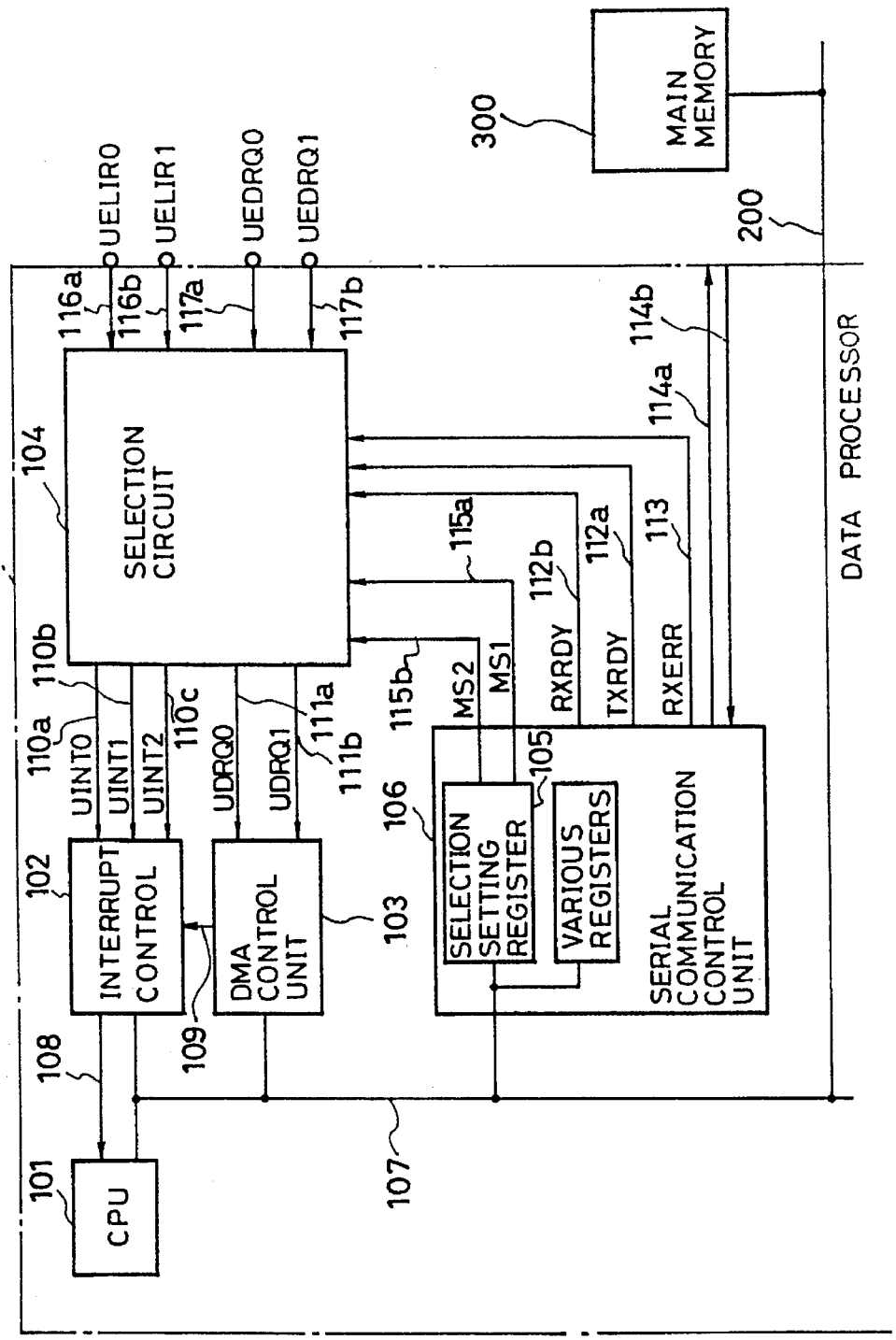
FIG. 1 is a block diagram of a data processor according to an embodiment of the invention.

In FIG. 1, the data processor 100 comprises a central processing unit (CPU) 101; an interrupt control unit 102 with three inputs for receiving interrupt request as interrupt control means for controlling interrupts to the CPU 101; a direct memory access (DMA) control unit 103 with two inputs for receiving DMA requests as DMA control means for directly accessing a main memory 300 which stores information necessary for data processing and applying an interrupt request to the interrupt control unit 102; a serial communication control unit 106 as serial communication control means for activating not only a transmission or reception ready signal upon completion of the transmission or reception of a piece of data to request writing the next transmitting data or reading the received data but also a reception error signal when an error takes place; a selection circuit 104 as selection means for switching a ready signal and an error signal from the serial communication control unit 106 and two external interrupt request signals and two external DMA request signals from the outside to either the interrupt control unit 102 or the DMA control unit 103; and a 2-bit selection setting register 105 provided within the serial communication control unit 106 along with other registers as selection circuit 104 in response to an instruction from the CPU 101.

It further includes an internal bus 107 within the data processor 100; an interrupt signal line 108 for connecting the interrupt control unit 102 to the CPU 101; an interrupt request signal line 109 for connecting the DMA control unit 103 to the interrupt control unit 102; three interrupt request signal lines (UINT0-2) 110*l*–110*c* for connecting the selection circuit 104 to the interrupt control unit 102; two DMA transfer request signal lines (UDRQ0, 1) 111*a* and 111*b* for connecting the selection circuit 104 to the DMA control unit 103; a transmission ready signal line (TXDY) 112*a* and a reception ready signal line (RXRDY) 112*b* for carrying a transmission ready signal output from the serial communication control unit 106 to the selection circuit 104; a data transmission signal line 114*a* and a data reception signal line 114*b* used for serial communications by the serial communication control unit 106; two 2-bit mode selection signal lines (MS1, 2) 115*a* and 115*b* for carrying a mode selection signal from the selection setting register 105 to the selection circuit 104, with each bit of the register 105 being set by the CPU 101 via the internal bus 107; two external interrupt request signal lines (UELIR0, 1) 116*a* and 116*b* connected to the selection circuit 104; and two external DMA request signal lines (UEDRQ0, 1) 117*a* and 117*b* connected to the selection circuit 104. An external bus 200 connects the data processor 100 and the main memory 300.

Figure 2:
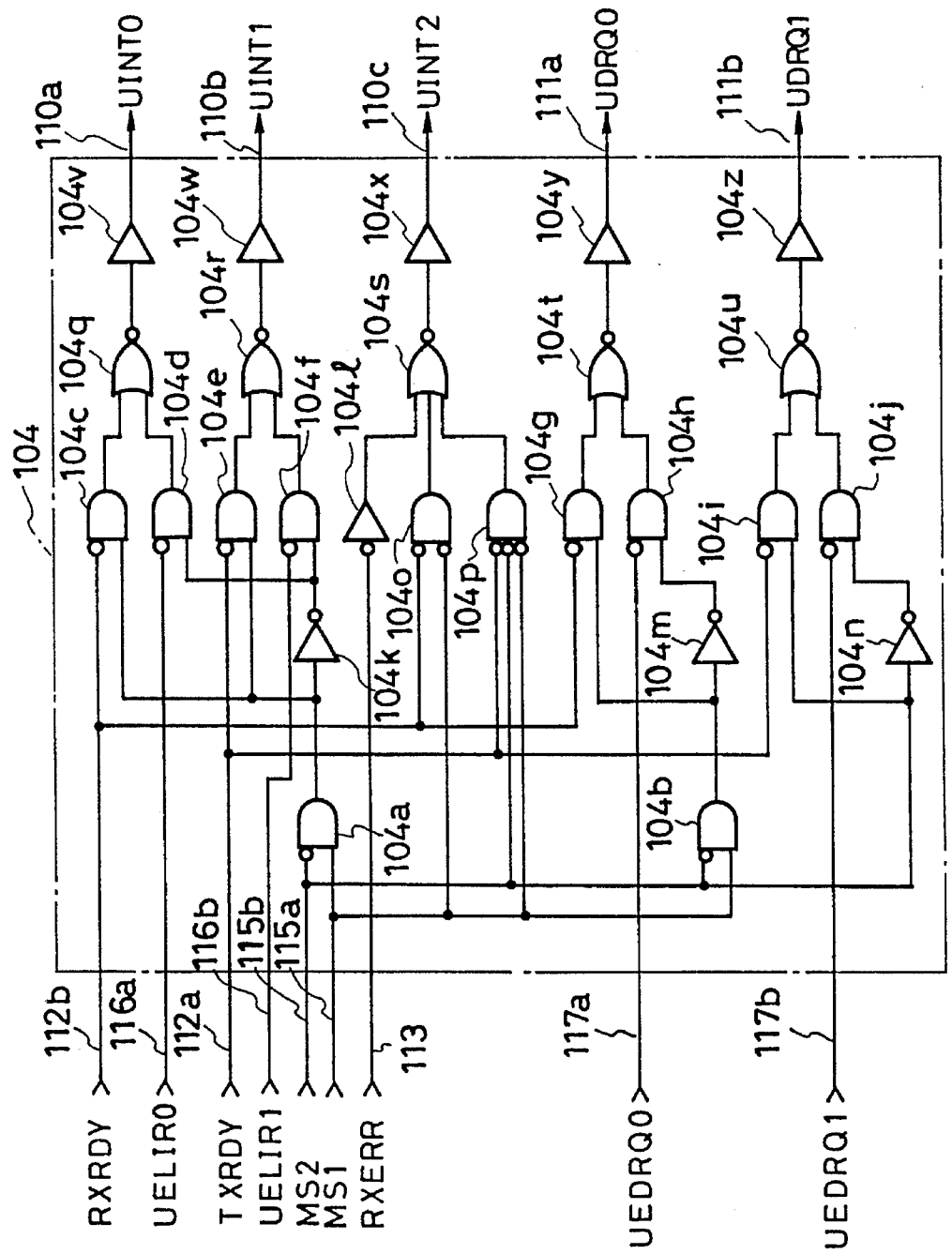
FIG. 2 is a logic circuit diagram of a selection circuit useful for the data processor of FIG. 1.

The selection circuit 104 of FIG. 1 is shown in more detail in FIG. 2. The selection circuit 104 comprises 10 AND gates 104*a*–104*j*; four NOT gates 104*k*–104*n*; five NOR gates; and five output buffers 104*v*–104*z*. Four connection modes such as shown in FIGS. 3(a)–3(d) are selected with a 2-bit mode selection signal (MS1, 2) set in the selection setting register 105. The inputs and outputs are made low active except for the mode selection signal (MS1, 2).

Figure 3:
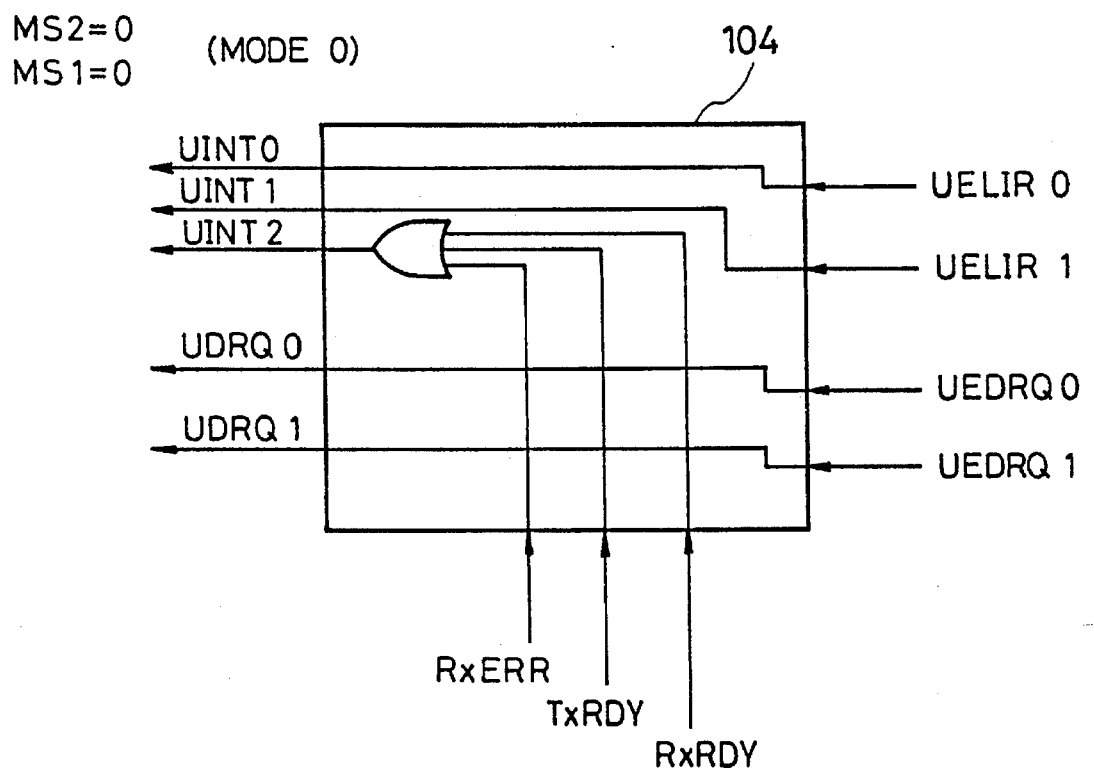
FIGS. 3(a)–3(d) show connection modes of signal lines within the selection circuit of FIG. 2.
Figure 3:
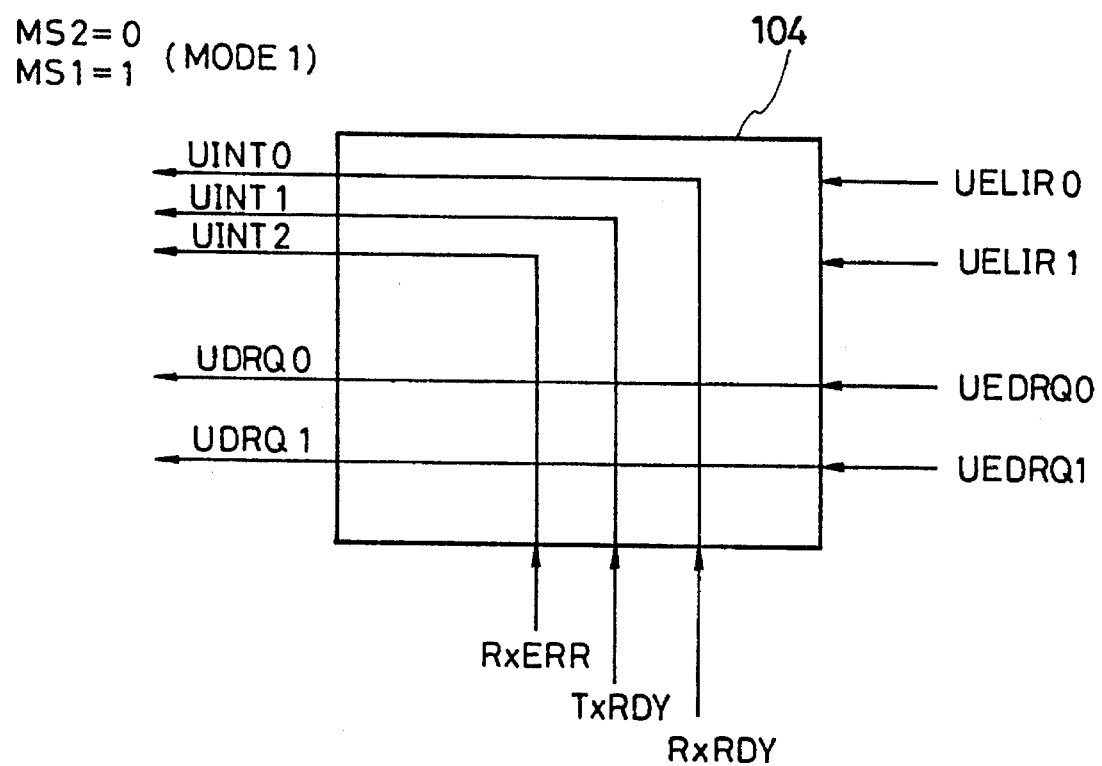
Figure 3:
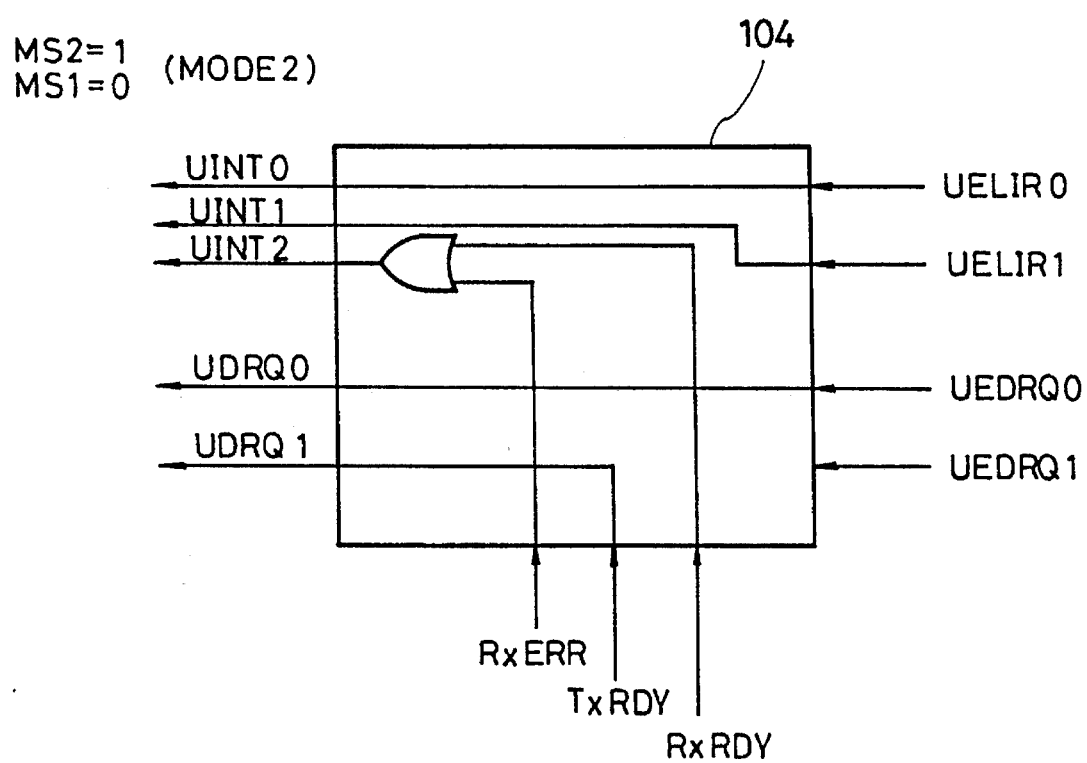
Figure 3:
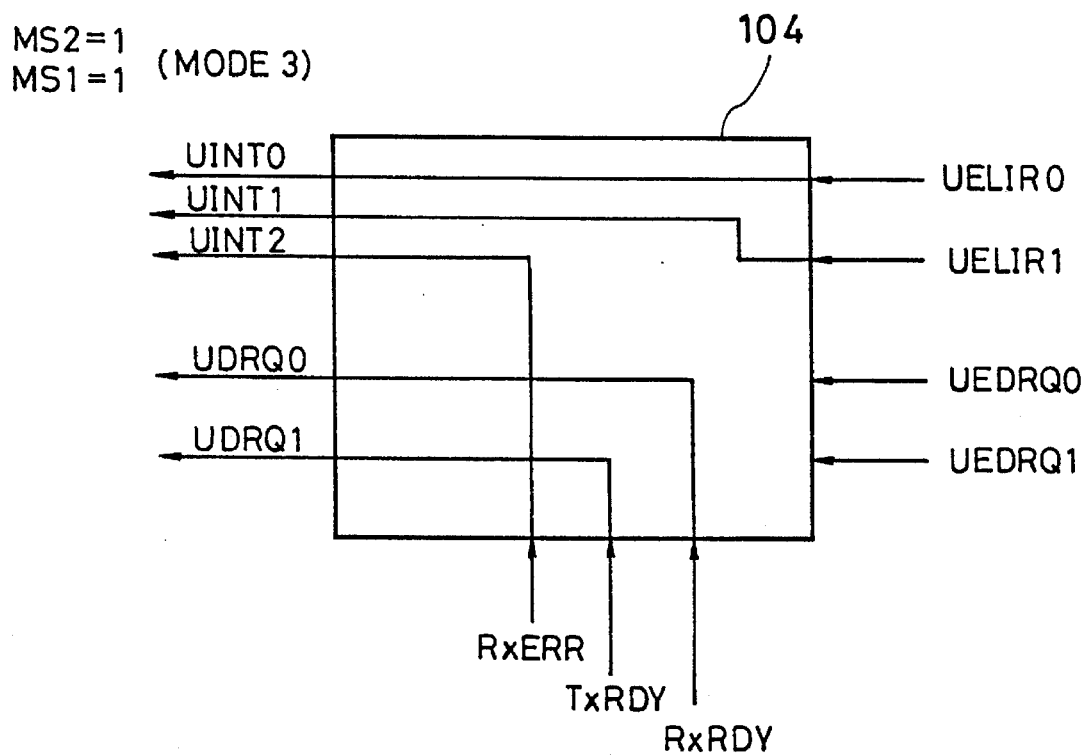
Figure 4:
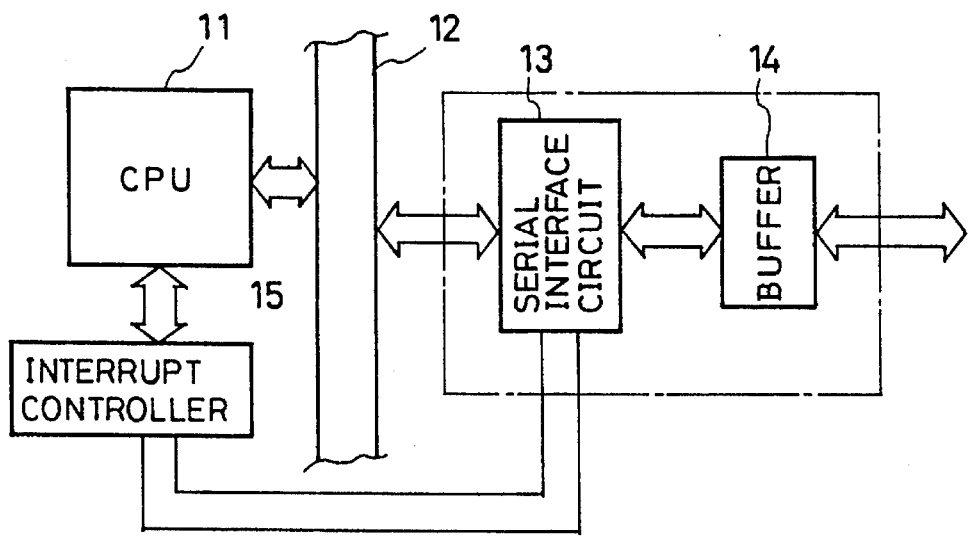
FIG. 4 is a block diagram of a conventional data processor.
Figure 5:
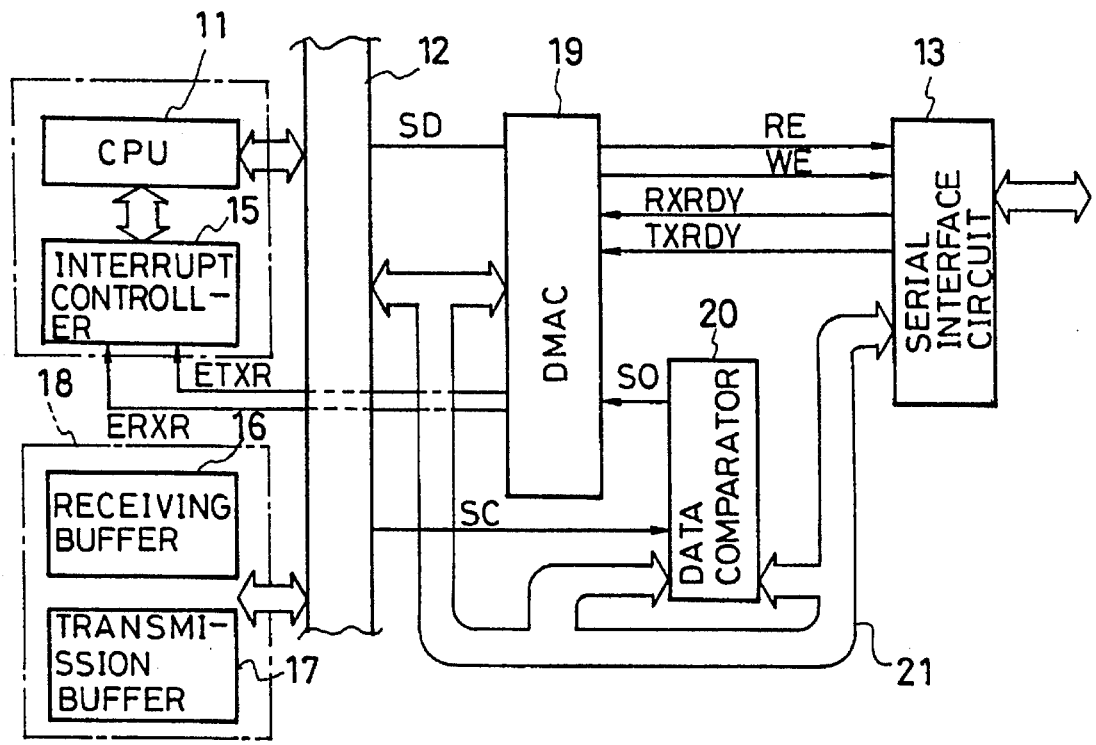
FIG. 5 is a block diagram of another conventional data processor.

The operation of this embodiment is described below with reference to FIGS. 1–3. The respective connection modes of input and output signal lines are selected in the selection circuit 104 by setting a mode selection setting value in the selection setting register 105 in response to an instruction from the CPU 101. The modes of the selection circuit 104 are set with the mode selection signal (MS1, 2) outputted from the selection setting register 105. These four modes are shown in FIGS. 3(a)–3(d).

In FIG. 3(a), the mode 0 is shown such that three input (TXRDY, RXRDY, and RXERR) from the serial communication unit 106 are ORed to output an interrupt request signal (UINT2) to the interrupt control unit 102. The two remaining interrupt request signals (UINT0, 1) and the two DMA request signal (UDRQ0, 1) are connected to the external interrupt request signals (UEDRQ0, 1) and the external DMA request signals (UEDRQ0, 1), respectively.

In FIG. 3(b), the mode 1 is shown such that the three inputs (TXRDY, RXRDY, and RXERR) are assigned to interrupt request signals (UINT0-2), respectively, and the two DMA request signals (UDRQ0, 1) are connected to the external DMA request signals (UEDRQ0, 1).

In FIG. 3(c), the mode 2 is shown such that the reception ready signal (RXRDY) and the reception error signal (RXERR) from the serial communication control unit 106 are ORed to produce an interrupt request signal (UINT2), and the transmission ready signal (TXRDY) is outputted as a DMA request signal (UDRQ1). The two remaining interrupt signals (UINT0, 1) and the other DMA request signal (UDRQ0) are assigned to the external interrupt request signals (UELIR0, 1) and the external DMA request signal (UEDRQ0).

In FIG. 3(d), the mode 3 is shown such that the reception ready signal (RXRDY) and the transmission ready signal (TXRDY) from the serial communication control unit 106 are connected to the DMA request signals (UDRQ0, 1), and the reception error signal (RXERR) is assigned to the interrupt request signal (UINT2). The two remaining interrupt request signals (UINT0, 1) are assigned to the external interrupt request signals (UELIR0, 1).

In this way, the selection circuit 104 not only switches the transmission and reception ready signals from the serial communication control unit 106 to the interrupt or DMA request signals but also sets the transmission and reception independently. In addition, there are two modes where the logical sum with the reception error signal is outputted. The larger the number of modes, the more adaptable the data processor to the work environment. However, the above four modes have been selected in this embodiment because the 2-bit selection hardware is appropriate.

For example, when an interrupt process for reception and a DMA transfer process for transmission are selected, the selection setting register 105 is set in the mode 2 or MS1=0 and MS2=1 so that the reception ready signal line (RXRDY) 112b and the transmission ready signal line (TXRDY) 112a are connected in the selection circuit 104 to the interrupt request signal line (UDRQ1) 111b, respectively. Upon completion of a cycle of data reception, the serial communication control unit 106 activates the reception ready signal (RXRDY), while since the selection circuit 104 has been set by the selection setting register 105 to select the interrupt process, the reception ready signal (RXRDY) through the selection circuit 104 is transmitted to the interrupt control unit 102 via the interrupt request signal line (UINT2) 110c. Consequently, an interrupt is applied to the CPU 101 via the interrupt signal line 108 for processing the interrupt. During the interrupt process, the CPU 101 accesses the serial communication control unit 106 to read the received data or process the data.

For transmission, when a cycle of data transmission is completed in the serial communication control unit 106, the transmission ready signal (TXRDY) is output from the serial communication control unit 106 in the same manner as for reception. Since the transmission process by DMA transfer has been set in the selection setting register 105, the transmission ready signal (TXRDY) is input to the DMA control unit 104 via the DMA transfer request signal line (UDRQ1) 111b. A block of data is transferred by DMA transfer by the DMA control unit 103 to the serial communication control unit 106 from the transmission data stored in a buffer memory area which has been allotted in the main memory 300. Thus, the serial communication control unit 106 resumes data transmission. In the transmission process by DMA transfer, the above flow is repeated until all the data in the buffer memory area is transferred. Upon completion of transfer of all the data, and interrupt indicative of the completion is applied to the CPU by the DMA control unit 103 via the interrupt request signal line 109, the interrupt control unit 102, and the interrupt signal line 108 so that the CPU carries out a transmission completion process.

As has been described above, the selection circuit 104 receives three signals; namely, the reception ready signal (RXRDY), the transmission ready signal (TXRDY), and the reception error signal (RXERR), from the serial communication control unit 106 and two pairs of signals; namely, the two interrupt request signal (UEIR0, 1) and the two DMA request signal (UEDRQ0, 1), from the outside and outputs the three interrupt request signals (UINT0-2) to the interrupt control unit 102 and the two DMA request signals (UDRQ0, 1) to the DMA control unit 103. That is, the selection circuit 104 not only switches the request signals from the serial communication control unit 106 but also selects their connections to the additional external interrupt and DMA request signals.

In this way, the functions of the interrupt control unit 102 and the DMA control unit 103 which are not used by the serial communication control unit 106 are fully utilized. In order to process independently interrupt requests or the reception ready, the transmission ready, and the reception error from the serial communication control unit 106, the interrupt control unit 102 has three inputs for receiving the requests. In order to process independently the DMA transfer requests for transmission and reception, the DMA control unit 103 has 2 channels. Although the three inputs are connected to the selection circuit 104, the serial communication control unit 106 does not use all of the request signals from the selection circuit 104 because of the mode setting.

Taking the mode 0 for example. As shown in FIG. 3(a), the three inputs from the serial communication control unit 106 are ORed to output an interrupt signal (UINT2) to the interrupt control unit 102. In this respect, two of the request signal lines to the interrupt control unit 102 or the DMA control unit 103 are not used. These signal lines are used for external request signals so that it is possible to use from the outside the two request receiving inputs of the interrupt control unit 102 and the two input channels of the DMA control unit 103. If there were no selection of the connections with the external request signal lines, the request receiving inputs of the interrupt control unit 102 and the input channels of the DMA control unit 103 which are not used by the serial communication control unit 106 would be wasted, failing to make efficient use of the hardware resources of the data processor. Thus, the selection circuit 104 assigns the request signal lines which are not used by the serial communication control unit 106 to external request inputs for all the modes so that the hardware resources of the data processor are fully utilized.

The above data processor uses three request receiving inputs to the interrupt control unit 102, two channels to the DMA control unit 103, and two external request inputs for interrupt or DMA are used; the selection setting register 105 make in the form of a 2-bit, 4-mode configuration; and the selection circuit 104 made as shown in FIG. 2, but the number of bits of the register 105 and the structure of the selection circuit 104 may be modified according to the number of inputs or outputs and/or the number of modes required.

As has been described above, with the data processor according to the invention which includes a selection unit for selecting the connections between the ready and error signals from the serial communication unit and the request receiving inputs of the interrupt control unit and the DMA control unit; and a selection setting unit for setting a connection mode of the selection unit, it is possible to switch the ready signal from the serial communication control unit to either the interrupt control unit as an interrupt request or the DMA control unit as a DMA request by programming the contents of the selection setting unit. As a result, it is possible to switch according to the application between a process by interrupt which is suitable for adding a process for each data input from the keyboard and a process by DMA transfer which is suitable for processing a large amount of data at high speeds, thus providing a flexible system. In addition, since the request receiving inputs not used by the serial communication control unit are assigned to external requests, it is possible to make efficient use of the hardware resources of the data processor.

We claim:

1. A single integrated circuit data processor for communicating data with a main memory having a portion for storing data to be received by the single integrated circuit data processor, the single integrated circuit data processor comprising:

a data bus connected to the main memory;

a central processing unit coupled to said data bus, said central processing unit for issuing instructions and for processing data over said data bus, said central processing unit responsive to an interrupt request received at an interrupt signal line;

a serial communication control unit, coupled to said central processing unit by said data bus, for independently controlling serial reception of data from an external reception port and for asserting a ready signal on a ready signal line responsive to a status of said serial reception;

an interrupt control unit, coupled to said central processing unit and said data bus, for asserting said interrupt request on said interrupt signal line responsive to receipt of an interrupt request signal at any of one or more interrupt request lines;

a direct memory access (DMA) control unit, coupled to said data bus and the main memory, for controlling direct memory access, relative to the main memory, responsive to receipt of a DMA transfer request signal at any of one or more DMA transfer request lines;

a selection setting register, coupled to said central processing unit by said data bus and responsive to an instruction from said central processing unit, for producing a mode selecting signal on a mode selection line, said mode selecting signal being generated according to said instruction; and a selection circuit, coupled to said mode selection line, to said one or more interrupt request lines, to said one or more DMA transfer request lines, to said ready signal line, and to one or more external request lines, said selection circuit responsive to said mode selecting signal for selectively coupling said ready signal line to one of said one or more interrupt request lines and said one or more DMA transfer request lines, said selection circuit further coupling unused ones of said one or more interrupt request lines and said one or more DMA transfer request lines to said external request lines.

2. The data processor of claim 1, wherein said serial communication control unit further asserts a reception error signal when an error is present.

3. The data processor of claim 1, wherein said external request lines include external interrupt request lines.

4. The data processor of claim 1 wherein said external request lines include external DMA transfer request lines.

5. A single integrated circuit data processor for communicating data with a main memory having a portion for storing data for transmission by the single integrated circuit data processor, the single integrated circuit data processor comprising:

a data bus connected to the main memory;

a central processing unit coupled to said data bus, said central processing unit for issuing instructions and for processing data over said data bus, said central processing unit responsive to an interrupt request received at an interrupt signal line;

a serial communication control unit, coupled to said central processing unit by said data bus, for independently controlling serial transmission of data through an external transmission port and for asserting a ready signal on a ready signal line responsive to a status of said serial transmission;

an interrupt control unit, coupled to said central processing unit and said data bus, for asserting said interrupt request on said interrupt signal line responsive to receipt of an interrupt request signal at any of one or more interrupt request lines;

a direct memory access (DMA) control unit, coupled to said data bus and the main memory, for controlling direct memory access, relative to the main memory, responsive to receipt of a DMA transfer signal at any of one or more DMA transfer request lines;

a selection setting register, coupled to said central processing unit by said data bus and responsive to an instruction from said central processing unit, for producing a mode selecting signal on a mode selection line, said mode selecting signal being generated according to said instruction; and a selection circuit, coupled to said mode selection line, to said one or more interrupt request lines, to said one or more DMA request line, to said ready line, and to one or more external request lines, said selection circuit responsive to said mode selecting signal for selectively coupling said ready signal line to one of said one or more interrupt request lines and said one or more DMA transfer request lines, said selection signal further coupling unused ones of said one or more interrupt request lines and said one or more DMA transfer request lines to said external request lines.

6. The data processor of claim 5, wherein said external request lines include external interrupt request lines.

7. The data processor of claim 5, wherein said external request lines include external DMA request lines.

8. A single integrated circuit data processor for communicating data with a main memory having a first portion for storing data for transmission by the single integrated circuit data processor and a second portion for storing data received by the single integrated circuit data processor, the single integrated circuit data processor comprising:

a data bus connected to said main memory;

a central processing unit coupled to said data bus, said central processing unit for issuing instructions and for processing data over said data bus, said central processing unit responsive to an interrupt request received at an interrupt signal line;

a serial communication control unit, coupled to said central processing unit by said data bus, for independently controlling both a serial transmission and a serial reception of data to an external transmission port and from an external reception port, respectively, and for selectively asserting any of a reception ready signal on a reception ready signal line, a transmission ready signal on a transmission ready signal line or a reception error signal on a reception error signal line responsive to a status of said serial transmission and said serial reception;

an interrupt control unit, coupled to said interrupt signal line of said central processing unit and to said data bus for asserting said interrupt request on said interrupt signal line responsive to receipt of a signal at any of one or more interrupt request lines;

a direct memory access (DMA) control unit, coupled to said data bus, for controlling direct memory access, relative to the main memory, responsive to receipt of a signal at any of one or more DMA transfer request lines;

a selection setting register, coupled to said central processing unit by said data bus and responsive to an instruction from said central processing unit, for providing a mode selecting signal on a mode selecting signal line to select a connection mode, said mode selecting signal being generated responsive to said instruction; and a selection circuit, coupled to said mode selecting signal line, to said interrupt signal line, to said DMA control unit, to said signal lines of said serial communication control unit, to one or more external interrupt request lines and to one or more external DMA request lines, said selection circuit responsive to said mode selecting signal, for setting the connection mode by configuring itself to couple said reception ready signal, said transmission ready signal, and said reception error signal to selected ones of said ones of said one or more interrupt request lines and said one or more DMA transfer request lines, while coupling unused ones of said one or more interrupt request lines and said one or more DMA transfer request lines to selected ones of said external interrupt request lines and said external DMA request lines.

9. The data processor of claim 8, wherein said selection setting register has a predetermined number of bits for providing said mode selecting signal for setting connection modes for said selection circuit with said connection modes including:

a first mode in which a logic sum of said transmission ready signal, said reception ready signal, and said reception error signal is coupled to a first interrupt request line of said interrupt control unit, and two of said external interrupt request lines and two of said external DMA request lines are coupled to said interrupt control unit and said DMA control unit, respectively;

a second mode in which said transmission ready signal, said reception ready signal and said reception error signal are coupled to said interrupt control unit, and two of said external DMA request lines are coupled to said DMA control unit;

a third mode in which a logic sum of said reception ready signal and said reception error signal is coupled to one of said interrupt request lines, said transmission ready signal is coupled to one of said DMA request lines, two of said external interrupt request lines and one of said external DMA request lines are coupled to said interrupt control unit and said DMA control unit, respectively; and a fourth mode in which said transmission ready signal and said reception ready signal are coupled to said DMA control unit, said reception error signal and two of said external interrupt request lines are coupled to said interrupt control unit;

wherein in any of said connection modes any of said inputs of said interrupt control unit and said DMA control unit that are not coupled to any of said transmission ready signal, said reception ready signal and said reception error signal are coupled to said external request lines.

10. Method for configuring a data processor for serial communications wherein the data processor includes a central processing unit, a serial communications controller for generating one or more communications control signals, a DMA controller having one or more DMA request lines and an interrupt controller having one or more interrupt request lines, comprising the steps of:

establishing a serial communications mode for the data processor by selecting at least one of the following modes: a DMA transfer mode and an interrupt transfer mode;

receiving a first plurality of interrupt request signals and a second plurality of DMA request signals at a selection circuit; and configuring said selection circuit, responsive to said serial communications mode, to route particular ones of the communication control signals from the serial communications controller to selected ones of the one or more interrupt request lines of the interrupt controller and the one or more DMA transfer request lines of the DMA controller, said selection circuit also routing, depending upon said communications mode, a first subset of said first plurality of interrupt request signals to those ones of the one or more interrupt request lines of the interrupt controller not coupled to any one of the communication control signals from the serial communications controller and a second subset of said second plurality of DMA request signals to those ones of the one or more DMA transfer request lines of the DMA controller not coupled to any one of the communication control signals from the serial communications controller.

* * * * *